INVENTOR.
Argyle G. Lautzenhiser
BY
Paul J. Ethington
ATTORNEY

United States Patent Office 3,146,038
Patented Aug. 25, 1964

3,146,038
THREE-AXIS MAGNETIC SUSPENSION
Argyle G. Lautzenhiser, Essex, Mass., assignor to General Motors Corporation, Detroit, Mich., a corporation of Delaware
Filed Feb. 7, 1962, Ser. No. 171,686
6 Claims. (Cl. 308—10)

This invention relates to three-axis magnetic suspension of a body and in particular to an improvement thereof for increasing the stiffness of magnetic suspension.

One form of three-axis magnetic suspension arrangement in the prior art comprises a body such as a floated instrument having coaxially disposed rotors mounted thereon, each rotor being radially centered between pairs of oppositely disposed stator poles of a microsyn. Each pole has wound thereon an A.C. energized coil connected in series with a capacitor forming a tuned circuit. The rotors and poles of the microsyn have corresponding canted surfaces so that a displacement of the body in the direction of one of the poles results in an increase in inductance of the coil wound thereon causing a decrease in the current flowing in the coil and hence a decrease in the attractive magnetic force between the pole and the corresponding rotor on the suspended body. At the same time, the current flowing in the coil wound on the opposite pole has increased resulting in an increase in the attractive magnetic force between that pole and the rotor tending to recenter the body. Magnetic suspension arrangements as described are both axially and radially unstable since any shift of frequency or capacitance of the tuned circuits will result in axial and radial displacements of the suspended body.

Another magnetic suspension arrangement known in the prior art comprises a body having an annular pole with a narrow face facing a second annular pole with a narrow face in the direction of the geometric axis of the body across a short gap and a radial annular pole with a narrow face facing another annular pole with a narrow face in the direction radially of the geometric axis of the body and permanent magnet means for energizing the poles so as to force flux through the gap between the poles. However, magnetic suspension arrangements as described utilize saturated pole tips so as to obtain high concentration of magnetic flux in the gaps. Furthermore, such suspension arrangements have D.C. excited poles and thus are subject to adverse effects of magnetic hysteresis.

In accordance with the present invention, a three-axis magnetic suspension arrangement is provided wherein the disadvantages of the above-mentioned arrangements are minimized or eliminated. This is accomplished by magnetically suspending a body between two electromagnets, each electromagnet including a coil excited by a constant A.C. voltage source and connected in series with a capacitor forming an LC tuned circuit. A displacement of the body with respect to the electromagnet causes a change in reactance of the LC tuned circuits resulting in a restoring magnetic force tending to return the body to its original position. The stiffness of magnetic suspension radially of the electromagnet may be increased by utilizing armatures and pole pieces of electromagnets having pole faces with pluralities of thin coaxial annular rings therein providing high permeance gradients. The stiffness of magnetic suspension axially of the electromagnets may be increased by augmenting the LC tuned circuits with control means responsive to the difference in current flowing through the coils of the electromagnets and operative to feed a control signal to compensating coils located in the field of the electromagnets so as to control the magnitude of the magnetic forces created by the electromagnets.

A more complete understanding of this invention may be had from the detailed description which follows taken in conjunction with the drawings in which.

Figure 1:
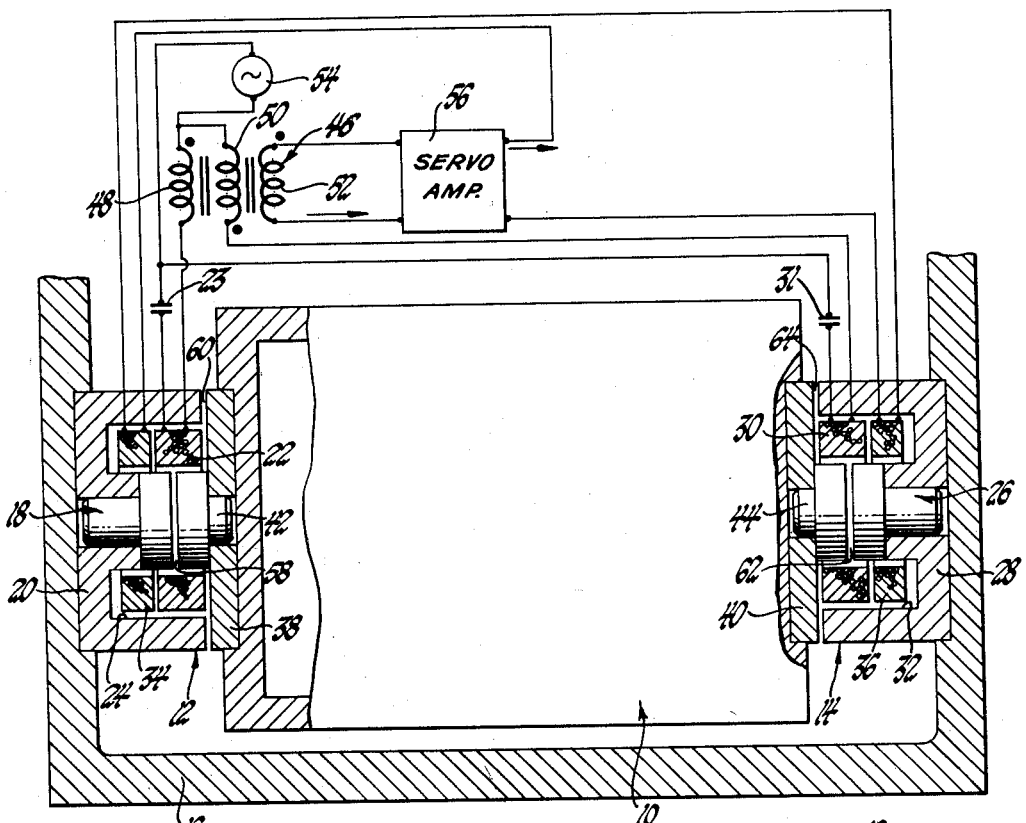
FIGURE 1 is a diagrammatic representation of one embodiment of the invention.

Referring to the drawings and in particular to FIGURE 1 there is shown an illustrative embodiment of the invention. A cylindrical body 10 which may take the form of a gyroscope float is magnetically suspended between two coaxially disposed electromagnets 12 and 14. The electromagnet 12 comprises a ferromagnetic, T-shaped cylindrical pole piece 18 mounted on a ferrite cup 20 suitably secured to a support frame 16 and an electromagnet coil 22 mounted in an annular groove 24 in the cup 20. The electromagnet 14 comprises a ferromagnetic, T-shaped cylindrical pole piece 26 mounted on a ferrite cup 28 suitably secured to the support frame 16 and an electromagnet coil 30 mounted in an annular groove 32 in the cup 28. Compensating coils 34 and 36 are respectively mounted in the annular grooves 24 and 32. Ferrite covers 38 and 40 are suitably secured to the body 10 and serve to respectively mount thereon to coaxially disposed ferromagnetic, T-shaped cylindrical armatures 42 and 44.

Figure 2:
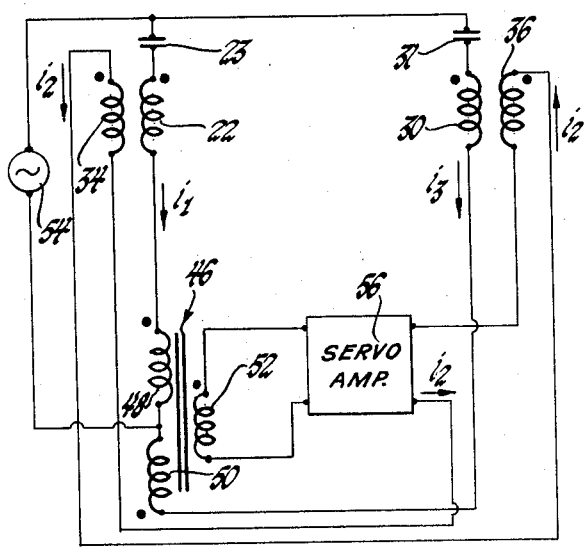
FIGURE 2 is a schematic diagram of a control circuit which may be used in conjunction with the embodiment of the invention shown in FIGURE 1.

The electromagnet coil 22 is connected in series with a capacitor 23 forming an LC tuned circuit and the electromagnet coil 30 is connected in series with a capacitor 31 forming a second LC tuned circuit. In FIGURE 2 there is shown a control circuit including a transformer 46 having oppositely wound primary windings 48 and 50 and a secondary winding 52. The primary winding 48 is connected in series with the coil 22 and the capacitor 23 across a constant A.C. voltage source 54. The primary winding 50 is connected in series with the coil 30 and the capacitor 31 across the source 54. The secondary winding 52 is connected with a servo amplifier 56 the output terminals of which are connected with a circuit comprising the compensating coils 34 and 36 connected together in series but oppositely wound. The instantaneous polarities of the coils and the transformer windings are shown by the dots in FIGURE 2.

Figure 3:
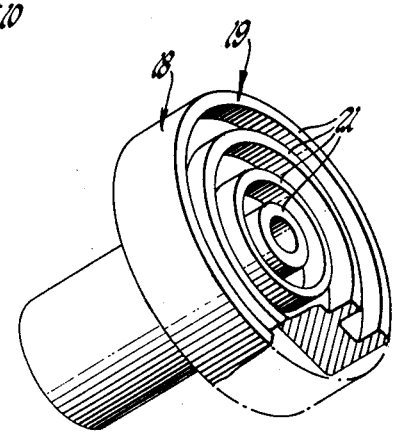
FIGURE 3 is a perspective view of a pole piece of an electromagnet having a pole face embodying the invention.

The pole pieces 18 and 26 of the electromagnets 12 and 14, respectively, and the armatures 42 and 44 have matching pole faces of a configuration as shown in FIGURE 3. The pole piece 18 includes a pole face 19 having a plurality of thin concentric and coaxially spaced annular projections or rings 21 formed therein. In the preferred form, each ring has a thickness no greater than the gap length between the pole faces of the pole pieces and armatures when the body 10 is axially centered between the electromagnets and adjacent annular rings are spaced from each other a distance approximately equal to four times the thickness of each ring so as to provide a high permeance gradient as is explained hereinafter.

The source 54 provides current flow in coils 22 and 30 of the electromagnets 12 and 14, respectively, creating attractive magnetic forces which act on the body 10 tending to support it. The electromagnets 12 and 14 are operated below the knee of the characteristic magnetization curves of the ferromagnetic pole pieces and armatures permitting operation below saturation values. This is necessary to permit variations in reactance of the LC tuned circuits as is described hereinafter. In addition, operation below saturation values is necessary since otherwise high permeance gradients in the radial direction would not be obtained, the importance of which is also described hereinafter. The magnetic flux created by the electromagnet 12 flows as follows: from the pole piece 18, across a gap 58, the armature 42, the ferrite cover 38, across a gap 60, the ferrite cup 20, and back to the pole piece 18. Similarly, the magnetic flux created by the electromagnet 14 flows as follows: from the pole piece 26, across a gap 62, the armature 44, the ferrite cover 40, across a gap 64, the ferrite cup 28 and back to the pole piece 26.

If the body 10 is displaced radially of its axis of symmetry there will result an increase in reluctance of the gaps 58 and 62 and hence the flux lines will crowd together in the areas of minimum reluctance. Since the electromagnets 12 and 14 are excited by a constant alternating voltage such changes in reluctance results in forces being set up which act on the armatures 42 and 44 in a direction to decrease the reluctance and increase the permeance and hence move the armatures toward the configuration of minimum reluctance tending to radially recenter the body 10 with respect to the pole pieces 18 and 26 of the electromagnets 12 and 14, respectively.

The stiffness of magnetic suspension in the radial direction changes with the permeance of the magnetic flux path and it has been found that the stiffness increases with increasing rate of change of overlapping of matched areas such as pole pieces and armatures having pole faces with pluralities of thin coaxial annular rings therein. However, since stray torques which may be produced by any non-homogeneity of the pole faces of such pole pieces and armatures are proportional to the mean diameter of the pole faces, it is desirable that the pole faces have small mean diameters. One satisfactory design for the pole faces of the electromagnet pole pieces and armatures is shown in FIGURE 3 and comprises a plurality of thin coaxial annular projections or rings each ring having a thickness no greater than that of the gap distance between facing pole faces of the electromagnetic pole pieces and armatures when the body 10 is axially centered between the electromagnets 12 and 14 and having a spacing between adjacent annular rings of approximately four gap lengths. This design provides a high permeance gradient and hence a high degree of stiffness of magnetic suspension in the radial direction without the disadvantage of any stray torques or coupling forces due to any non-homogeneity of the pole faces.

If the body 10 is axially displaced there will result a a change in length of gaps 58 and 62 between the pole piece 18 of the electromagnet 12 and the armature 42 and the pole piece 26 of the electromagnet 14 and the armature 44, respectively, resulting in a change in reluctance of the flux path of each gap. This will result in a change in inductance of the coil of each electromagnet causing the current flowing therein to change and thus in turn causing a change in the attractive magnetic force between the electromagnets and the armatures. If a curve of current flow in each tuned circuit is plotted as a function of reactance of each tuned circuit it would have essentially the same shape as a universal resonance curve for a series resonant circuit. By operating each tuned circuit in the vicinity of the one-half power point the value of current flowing in each tuned circuit when the body 10 is in its null or centered position will be equal, i.e. at a quiescent current value, and hence no net axial magnetic force will act on the body 10. However, if the body 10 is axially displaced, for example, to the left in FIGURE 1, the length of gap 58 will decrease and the length of gap 62 will increase and since a constant A.C. voltage from source 54 is applied across each tuned circuit, the current flowing in coil 22 will decrease and the current flowing in coil 30 will increase. The value of current flowing in coil 22 will become less than the quiescent current value and the value of the current flowing in coil 30 will become greater than the quiescent current value. This will result in a decrease in the attractive magnetic force in gap 58 and in increase in the attractive magnetic force in gap 62 resulting in a net axial magnetic force acting on the body 10 tending to axially recenter it between the electromagnets 12 and 14. The capacitors 23 and 31 in the tuned circuits provide steeper characteristic curves of current flow vs. inductance of each tuned circuit than would be the case without the capacitors and thereby a faster response time is obtained with a corresponding increase in the stiffness of magnetic suspension of the body 10 in the axial direction.

The stiffness of magnetic suspension of the body 10 in the axial direction may be increased for certain applications of the invention by augmenting the LC tuned circuits described above with the control circuit shown in FIG. 2. When the body 10 is in its axially centered position a current $i_1$ flowing in the coil 22 is equal to a current $i_3$ flowing in the coil 30 and since the windings 48 and 50 are oppositely wound on the transformer 46, the magnetomotive forces produced by current flowing therethrough will be in opposition to each other. Thus no net voltage will be induced in the secondary winding 52 and no output signal will be obtained from the servo amplifier 56. However, if the body 10 is axially displaced toward the left in FIGURE 1, causing a decrease in the length of gap 58 and a corresponding increase in the length of gap 62 there will result a decrease in the current $i_1$ flowing through the coil 22 and an increase in the current $i_3$ flowing through the coil 30 and thus the magnetomotive force created by the current $i_1$ flowing in the winding 48 will be less than the magnetomotive force created by the current $i_3$ flowing in the winding 50 and hence a voltage will be induced in the winding 52 of a polarity such that a current $i_2$ is obtained from the amplifier 56 which will be in phase with the current $i_3$ and 180 degrees out of phase with the current $i_1$. The current $i_2$ will flow through the compensating winding 34 in a direction as indicated by the dots in FIGURE 2 so as to create a magnetomotive force opposing the magnetomotive force created by the current $i_1$ flowing in the coil 22 resulting in a net decrease in the attractive magnetic force between the pole piece 18 and the armature 42. The current $i_2$ will also flow through the winding 36 in a direction as indicated by the dots in FIGURE 2 so as to create a magnetomotive force which aids the magnetomotive force created by the current $i_3$ flowing through the winding 30 resulting in an increase in the attractive magnetic force between the pole piece 26 and the armature 44. Thus a net attractive magnetic force acts on the body 10 so as to axially recenter the body 10 between the pole pieces 18 and 26 of the electromagnets 12 and 14, respectively. In a similar manner, if the body 10 is displaced toward the right in FIGURE 1, resulting in a decrease in the current $i_3$ flowing in the coil 30 and a corresponding increase in the current $i_1$ flowing in the coil 22, the current $i_2$ flowing from the servo amplifier 56 will be in phase with the current $i_1$ and 180 degrees out of phase with the current $i_3$. The current $i_2$ will flow through the winding 34 in a direction so as to aid the magnetomotive force created by the current $i_1$ flowing through the coil 22 and through the winding 36 so as to oppose the magnetomotive force created by the current $i_3$ flowing through the winding 30 resulting in a net attractive magnetic force acting on the body 10 to axially recenter the body 10 between the pole pieces 18 and 26 of the electromagnets 12 and 14, respectively.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A magnetic suspension system for providing three axis magnetic suspension of a body and comprising first and second electromagnets disposed adjacent but spaced from opposite sides of the body and along a selected axis thereof, each electromagnet comprising an energizing coil and means providing a flux path therefor, the flux path including a magnetic pole piece mounted on supporting means, each pole piece having a pole face with a plurality of coaxial annularly projecting rings therein, means disposed on the body for completing the flux path including first and second coaxially disposed magnetic armatures disposed adjacent but spaced from the pole pieces, the first and second armatures having pole faces with pluralities of coaxial annularly projecting rings therein associated with and corresponding in configuration with the annular rings in the pole faces of the pole pieces of the first and second electromagnets, respectively, circuit means connected with each coil for applying constant alternating voltage thereto so as to develop attractive magnetic forces between each electromagnet and its associated armature on the body, the configuration of the pole faces of the armatures and pole pieces of the electromagnets affording high permeance gradients so as to obtain a high degree of stiffness of magnetic suspension resisting displacements of the armatures transversely of the pole faces of the pole pieces of the electromagnets, the pole faces of the first and second armatures being equally spaced from and having their annular rings facing the corresponding annular rings in the pole faces of the pole pieces of the first and second electromagnets, respectively, when the current flowing in the coil of the first electromagnet is equal to the current flowing in the coil of the second electromagnet, the coil of each electromagnet having an inductive reactance which varies inversely with axial displacements between the body and the electromagnet so as to vary the value of the current flowing therein, control means connected with the coils responsive to the difference in current flowing in the coils and operative to develop control signal voltages indicative of the extent and direction of axial displacements of the body with respect to the electromagnets, first and second compensating coils located in the magnetic field of the first and second electromagnets, respectively, connected with the control means and responsive to the output signal voltages so as to develop magnetic froces acting on the body restoring the body to its original position.

2. A magnetic suspension system for providing three axis magnetic suspension of a body and comprising first and second electromagnets disposed adjacent but spaced from opposite sides of the body and along a selected axis thereof, each electromagnet comprising a magnetic pole piece mounted on support means and having a coil wound thereon, each pole piece having a pole face with a plurality of coaxial annularly projecting rings therein, the body having first and second coaxially disposed magnetic armatures mounted thereon, the first and second armatures having pole faces with pluralities of coaxial annularly projecting rings therein associated with and corresponding in configuration with the annularly projecting rings in the pole faces of the pole pieces of the first and second electromagnets, respectively, each coil connected in series with a capacitor forming an LC tuned circuit, circuit means connected with each tuned circuit for applying constant alternating voltage thereto so as to develop attractive magnetic forces between each electromagnet and its associated armature on the body, the configuration of the pole faces of the armatures and pole pieces affording high permeance gradients so as to provide a high degree of stiffness of magnetic suspension resisting displacements of the body transversely of the pole faces of the pole pieces of the electromagnets, the pole faces of the first and second armatures being equally spaced from and having their annular rings facing the corresponding annular rings in the pole faces of the pole pieces of the first and second electromagnets, respectively, when the value of current flowing through each LC tuned circuit is equal, each tuned circuit exhibiting a reactance which varies inversely with axial displacements of the body with respect to the electromagnet associated with the tuned circuit so as to vary the value of the current flowing in the tuned circuit, control means connected with the tuned circuits responsive to the difference in current flowing in the tuned circuits and operative to develop control signal voltages indicative of the extent and direction of axial displacements of the body with respect to the electromagnets, first and second compensating coils located in the magnetic field of the first and second electromagnets, respectively, connected with the control means and responsive to the control signal voltages so as to develop magnetic forces acting on the body restoring the body to its original position.

3. A magnetic suspension system for providing three axis magnetic suspension of a body and comprising first and second electromagnets disposed adjacent but spaced from opposite sides of the body and along a selected axis thereof, each electromagnet comprising a magnetic pole piece mounted on support means and having a coil wound thereon, each pole piece having a pole face of small mean diameter with a plurality of coaxial annularly projecting rings therein, the body having first and second coaxially disposed magnetic armatures mounted thereon, the first and second armatures having pole faces with pluralities of coaxial annularly projecting rings therein associated with and corresponding in configuration with the annular rings in the pole faces of the pole pieces of the first and second electromagnets, respectively, each annular ring having a thickness no greater than the distance between corresponding pole faces of the armatures and pole pieces when the body is axially centered between the electromagnets, each coil connected in series with a capacitor forming an LC tuned circuit, circuit means connected with each tuned circuit for applying constant alternating voltage thereto so as to develop attractive magnetic forces between each electromagnet and its associated armature on the body, the configuration of the pole faces of the armatures and pole pieces affording high permeance gradients so as to provide a high degree of stiffness of magnetic suspension resisting displacements of the body transversely of the pole faces of the pole pieces of the electromagnets, the pole faces of the first and second armatures being equidistant from and having their annular rings facing the corresponding annular rings in the pole faces of the pole pieces of the first and second electromagnets, respectively, when the value of current flowing through each tuned circuit is equal, each tuned circuit exhibiting a reactance which varies inversely with axial displacements of the body with respect to the electromagnet associated with the tuned circuit so as to vary the value of the current flowing in the tuned circuit, control means connected with the tuned circuits responsive to the difference in current flowing in the tuned circuits and operative to develop control signal voltages indicative of the extent and direction of axial displacements of the body with respect to the electromagnets, first and second compensating coils located in the magnetic field of the first and second electromagnets, respectively, connected with the control means and responsive to the control signal voltages so as to develop magnetic forces acting on the body restoring the body to its original position.

4. A magnetic suspension system for providing three axis magnetic suspension of a body and comprising first and second electromagnets disposed adjacent but spaced from opposite sides of the body and along a selected axis thereof, each electromagnet comprising a magnetic pole piece mounted on support means and having a coil wound thereon, each pole piece having a pole face of small mean diameter with a plurality of coaxial annularly projecting rings therein, the body having first and second coaxially disposed magnetic armatures mounted thereon, the first and second armatures having pole faces with pluralities of coaxial annularly projecting rings therein associated with and corresponding in configuration with the annular rings in the pole faces of the pole pieces of the first and second electromagnets, respectively, each annular ring having a thickness no greater than the distance between corresponding pole faces of the armatures and pole pieces when the body is axially centered between the electromagnets, the distance between adjacent annular rings being approximately four times the thickness of each annular ring, each coil connected in series with a capacitor forming an LC tuned circuit, circuit means connected with each tuned circuit for applying constant alternating voltage thereto so as to develop attractive magnetic forces between each electromagnet and its associated armature on the body, the configuration of the pole faces of the armatures and pole pieces affording high permeance gradients so as to provide a high degree of stiffness of magnetic suspension resisting displacements of the body transversely of the pole faces of the pole pieces of the electromagnets, the pole faces of the first and second armatures being equidistant from and having their annular rings facing the corresponding annular rings in the pole faces of the pole pieces of the first and second electromagnets, respectively, when the value of current flowing through each LC tuned circuit is equal, each tuned circuit exhibiting a reactance which varies inversely with axial displacements of the body with respect to the electromagnet associated with the tuned circuit so as to vary the value of the current flowing in the tuned circuit, control means connected with the tuned circuits responsive to the difference in current flowing in the tuned circuits and operative to develop control signal voltages indicative of the extent and direction of axial displacements of the body with respect to the electromagnets, first and second compensating coils located in the magnetic field of the first and second electromagnets, respectively, connected with the control means and responsive to the control signal voltages so as to develop magnetic forces acting on the body restoring the body to its original position.

5. Apparatus for freely suspending a body by magnetic forces comprising first and second electromagnets disposed adjacent but spaced from opposite sides of the body and along a selected axis thereof, each of the electromagnets including an energizing coil and means providing a flux path therefor, the flux path including a pole piece disposed along the selected axis, the face of each of the pole pieces adjacent the body and having formed therein a plurality of concentric annularly projecting rings coaxial about the selected axis, means disposed on the body to complete the flux paths for the first and second electromagnets including armatures disposed along the selected axis, the faces of the armatures being disposed adjacent but spaced from respective faces of said pole pieces and having formed therein a plurality of concentric annularly projecting rings coaxial about the selected axis and adapted to be aligned with the rings of said pole pieces when the body is properly disposed with said electromagnets, circuit means for energizing said coil to provide magnetic forces tending to suspend the body.

6. Apparatus as defined in claim 5 wherein the radial with of each of the annularly projecting rings in the pole pieces and armatures is substantially equal to the spacing between the faces of the mutually adjacent pole pieces and armatures.

References Cited in the file of this patent
UNITED STATES PATENTS

| 2,733,857 | Beams | Feb. 7, 1956 |
| 3,061,805 | Broderson | Oct. 30, 1962 |
| 3,079,574 | Garcia | Feb. 26, 1963 |

FOREIGN PATENTS

| 1,159,301 | France | Feb. 10, 1958 |

UNITED STATES PATENT OFFICE
CERTIFICATE OF CORRECTION

Patent No. 3,146,038                         August 25, 1964

Argyle G. Lautzenhiser

It is hereby certified that error appears in the above numbered patent requiring correction and that the said Letters Patent should read as corrected below.

Column 5, line 46, for "froces" read -- forces --; column 8, line 25, for "with" read -- width --.

Signed and sealed this 2nd day of March 1965.

(SEAL)
Attest:

ERNEST W. SWIDER                         EDWARD J. BRENNER
Attesting Officer                            Commissioner of Patents